United States Patent [19]

Ramaswamy

[11] Patent Number: 5,319,061
[45] Date of Patent: Jun. 7, 1994

[54] IMPARTING MOISTURE RESISTANCE TO EPOXIES

[75] Inventor: Kollengode K. Ramaswamy, Southington, Conn.

[73] Assignee: The Humphrey Chemical Co., Inc., North Haven, Conn.

[21] Appl. No.: 927,085

[22] Filed: Aug. 7, 1992

[51] Int. Cl.$^5$ .................................. C08G 59/42
[52] U.S. Cl. .......................... 528/112; 427/104; 427/116; 428/460; 528/113; 528/115
[58] Field of Search .................. 528/112, 113, 115; 427/104, 116; 428/460

[56] References Cited

U.S. PATENT DOCUMENTS

| | | | |
|---|---|---|---|
| 2,661,349 | 12/1953 | Caldwell et al. | 260/224 |
| 2,693,966 | 11/1954 | Von Fuchs | 8/94.22 |
| 3,052,650 | 9/1962 | Wear et al. | 260/47 |
| 3,139,373 | 6/1964 | Liggett et al. | 162/180 |
| 3,412,111 | 11/1968 | Irwin et al. | 260/346.8 |
| 3,692,715 | 9/1972 | Groff et al. | 260/18 |
| 4,452,942 | 6/1984 | Shida et al. | 525/24 |
| 4,481,262 | 11/1984 | Shida et al. | 428/441 |
| 4,675,471 | 6/1987 | Shida et al. | 174/36 |
| 4,985,530 | 1/1991 | Murakami et al. | 525/524 |

FOREIGN PATENT DOCUMENTS 1345033  1/1974  United Kingdom .

OTHER PUBLICATIONS

Lee & Neville, *Handbook of Epoxy Resins,* Mar. 1967, pp. 6–47 through 6–48, 12–5 and 12–6.

R. E. Johnson et al. "Effect of Anhydride Structures on the Chemical and Physical Properties of Epoxy Resins", *27th Annual Technical Conference, Reinforced Plastics Composite Institute, The Society of Plastic Industry, Inc.,* ξ19–F, pp. 1–18, 1972.

B. Dobinson et al., "Hydroxyl-modified Epoxy Resins: Some Technical and Analytical Aspects", *Makromol. Chem.,* vol. 181(1), pp. 1–17, 1980.

M. Murray et al., "Mutagenic Activity of Epoxy Embedding Reagents Employed in Electron Microscopy", *Environmental Mutagenesis,* vol. 1, pp. 307–313, 1979.

M. E. Kuehne, "Thiyl Radical and Mercuric Ion Induced Cyclization of Dimethyl Diproparglymalonate and Dimethyl Propergyl-3-thiylallylmalonates", *J. Org. Chem.,* vol. 42, No. 21, 1972.

J. Emmanual et al., "Alteration of retrieved implants in vitro by processing and infiltrating fluids", *J. Biomed Mater. Res. Applied Biomaterials,* vol. 23, 337–47 (1989).

D. Hummel et al., "Pyro-field ion mass spectrometry, geo chromotography, and infrared Spectroscopy to investigate degradation behavior and structure of polymaleic anhydride as well as maleic anhydride isobutene copolymers", *2nd European Symposium on Polymer Spectroscopy,* Quadernie de La Ricerca Scientifica, vol. 54, pp. 23–41, 1973.

H. Kushida et al., "A New Embedding Medium Available for Stereoscopic Observance of Semi8–thin Sections under 200 kv Transmission Electron Microscope", *J. Electron Microsc.,* vol. 32(1), pp. 61–65, 1983.

L. G. Felix et al., "Preservation of Fabric Filter Dust Cake Samples", *Journal of Air Pollution Control Association,* vol. 33(11), pp. 1092–1094, 1983.

R. C. Johnson et al., "Effect of an Epoxized Nuvolac Resin Anhydride Structure on the Properties of Resin", *Polymer Engineering and Science,* vol. 13(5), pp. 357–364, 1973.

E. W. Flick, *Epoxy Resins Curing Agents, Compounds, and Modifiers, An Industrial Guide,* pp. 86, 134, 135, 156, 223, 224, 229, 232, 271, 284, 614–616, Noyes Publications (Park Ridge, N.J., 1987).

*Primary Examiner*—John C. Bleutge
*Assistant Examiner*—D. Aylward
*Attorney, Agent, or Firm*—Pennie & Edmonds

[57] ABSTRACT

The present invention is directed to a method of imparting moisture resistance to epoxies. Moisture resistant epoxy compositions are formed from epoxies and alkenylsuccinic anhydride (ASA) such as tripropenylsuccinic anhydride (TSA). The epoxy compositions, following cure, show surprisingly improved moisture resistance and retention of properties when exposed to warm, humid environments.

21 Claims, 3 Drawing Sheets

5,319,061

IMPARTING MOISTURE RESISTANCE TO EPOXIES

FIELD OF THE INVENTION

This invention relates to a method of imparting moisture resistance to materials or objects of manufacture. The invention particularly relates epoxy compositions with enhanced moisture resistance.

BACKGROUND OF THE INVENTION

In the electrical industry it is often necessary to insulate specific electrical components prior to assembly. Heat curable epoxy compositions which are liquid at room temperature have been employed in the art as impregnating and insulating compounds for electrical components such as electrical coils. See U.S. Pat. No. 3,052,650 and U.S. Pat. No. 3,692,715. The epoxy compositions of U.S. Pat. No. 3,052,650 are formed of an epoxy resin, a polycarboxylic acid anhydride, and a tertiary amine catalyst.

Although the epoxy compositions of the art have proven useful to impregnate and encapsulate electrical components, the compositions of the art tend to suffer loss of physical and electrical properties due to water absorption when exposed to moisture containing environments. The resin compositions of the art also tend to require lengthy curing times and to volatilize during the curing process.

A need therefore exists for epoxy compositions which show improved retention of properties when exposed to moisture containing environments and which avoid the deficiencies of the resins of the prior art.

SUMMARY OF THE INVENTION

The present invention is directed to a method of imparting improved moisture resistance to materials or objects of manufacture exposed to moisture containing environments. The method entails applying moisture resistant epoxy compositions formed of a mixture of an epoxy and alkenylsuccinic anhydrides (ASA's) to at least a portion of an article to be protected against moisture from moisture containing environments. The alkenylsuccinic anhydrides preferably have alkenyl side chains with 8-11 carbons. The epoxy compositions show surprisingly improved moisture resistance and retention of properties when exposed to moisture containing environments.

DETAILED DESCRIPTION OF THE INVENTION

Figure 1:
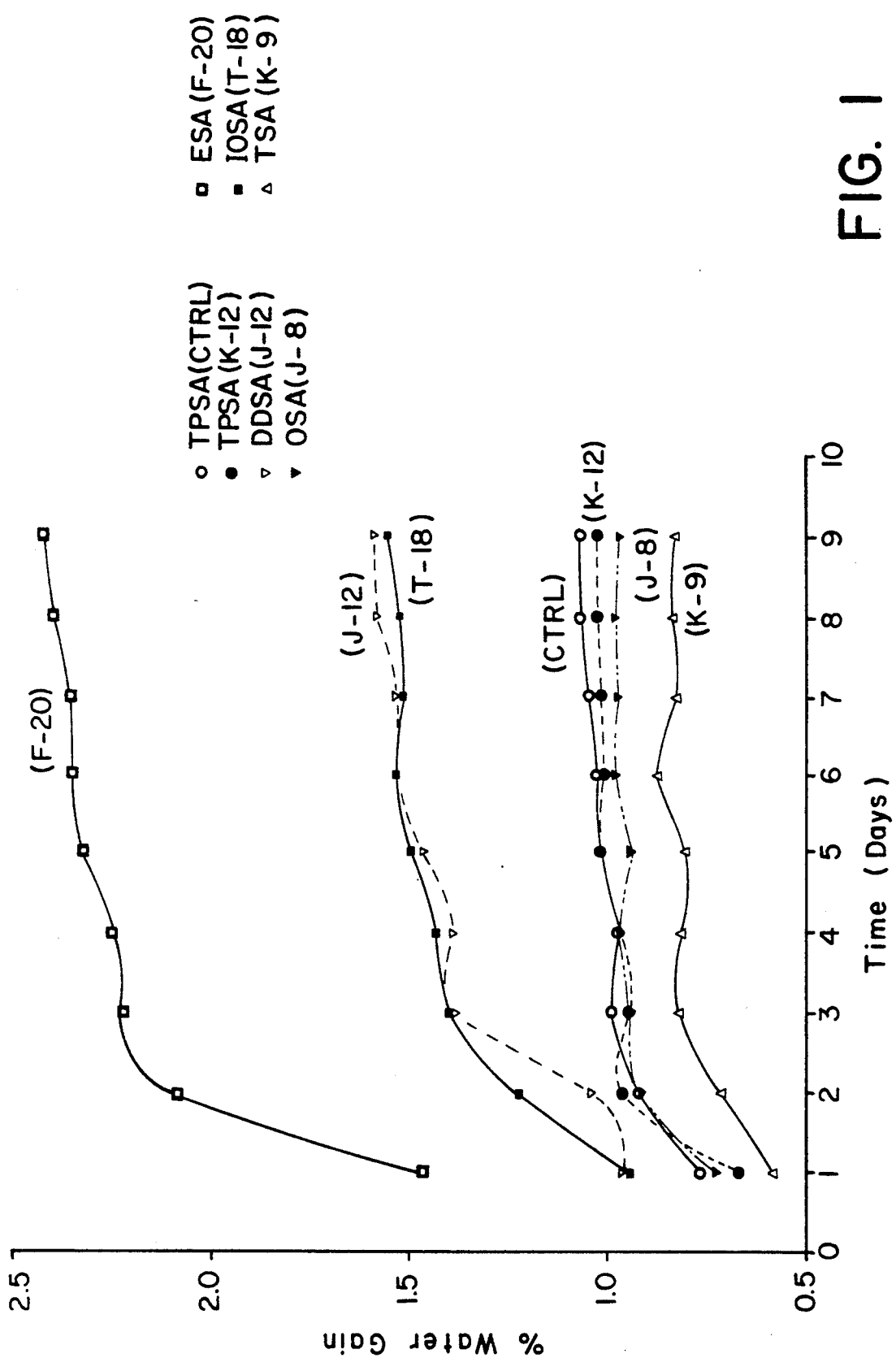
FIG. 1 is a graph showing the difference in relative percent of water gain of epoxies cured with various ASA's as measured over a period of nine days.

Having briefly summarized the invention, the invention will now be described in detail by reference to the following specification and non-limiting examples. Unless otherwise specified, all percentages are by weight and all temperatures are in degrees Celsius.

Generally, the epoxy compositions of the invention which provide improved moisture resistance are manufactured by adding an ASA to an epoxy resin to form a mixture thereof, and further treating the mixture with a curing agent. Preferably, the alkenylsuccinic anhydride has alkenyl side chains with 8-11 carbon atoms, most preferably side chains with 9 carbon atoms that have three carbon branching. Preferably, the mole ratio of epoxy resin to alkenylsuccinic anhydride is from about 1.0:0.80 to about 1.0:1.0, most preferably 1.0:0.88.

Epoxy resins useful in the epoxy compositions of the invention constitute the known class of resinous materials which contain the 1,2 epoxy linkage. Preferably, epoxy resins which may be employed in the invention include low chlorine bisphenol Type A epoxies and derivatives thereof.

Generally, the ASA's which may be employed in the invention are capable of forming ester linkages between the epoxy and the anhydride. These ester linkages are hydrolytically stable for up to 9 days or more when exposed to temperatures of up to 95° C. at relative humidities of up to 100%. The ASA's which may be employed in the invention include, but are not limited to, ASA's that have 6-18 carbons in the alkenyl side chains. These ASA's are exemplified by commercially available anhydrides such as dipropenylsuccinic anhydride, tripropenylsuccinic anhydride (TSA), tetrapropenylsuccinic anhydride (TPSA), pentapropenylsuccinic anhydride and hexapropenylsuccinic anhydride. Preferably, the ASA's employed in the invention have 8-11 carbons in the alkenyl side chains, most preferably 9 carbons with three carbon branching on the alkenyl side chains. The ASA's employed in the invention have alkenyl side chains in which at least ten percent, most preferably ninety percent, have nine carbon atoms with three carbon branching. The ASA's useful in the invention are compatible with epoxy resins and preferably have viscosities of 100-110 centipoise at 25° C.

TSA is most preferred to provide the improved moisture resistant epoxy compositions of the invention. TSA may be employed with additional ASA's to modify other properties of the epoxy composition. Additional ASA's which may be employed with TSA include, but are not limited to, ASA's that have more than eleven carbons in the alkenyl side chains. Examples of additional ASA's which may be employed with TSA include commercially available anhydrides such as n-dodecenylsuccinic anhydride (DDSA), TPSA, n-octenylsuccinic anhydride (OSA), eicosenylsuccinic anhydride (ESA), iso-octadecenylsuccinic anhydride (IOSA) and the like. The additional ASA preferably is TPSA, which has alkenyl side chains having 9-15, preferably 12, carbons with three carbon branching on the alkenyl side chains. Most preferably, the TPSA has alkenyl side chains in which at least 48.5% of the alkenyl side chains have 12 carbons.

The ratio the additional ASA to TSA will vary depending on the properties desired in the resin composition. Specific ratios of the additional ASA to TSA readily may be determined by those skilled in the art to attain one or more specific properties. Preferably, however, TSA is at least ten percent by weight of the epoxy composition.

The epoxy resin compositions of the invention typically include a curing agent. These curing agents may be for example, alkanolamines, secondary or tertiary amines, quarternary ammonium salts, alkylamino phenols or metal carboxylates. Typically, amines such as diethanolamine, alpha-methylbenzyldimethylamine and, most preferably, N,N-dimethylbenzylamine, may be employed.

The moisture resistant, epoxy compositions of the invention may be blended with additional materials to further improve the mechanical and physical properties of the epoxy compositions of the invention. Examples of these additional materials include dimer acids of carboxylic acid such as EMPOL 1022 by Emery Group/Henkel Co., trimer acids of carboxylic acid such as EMPOL 1040 from Emery Group/Henkel Co., and the like. The required amount of additional materials to be employed in the epoxy compositions of the invention readily can be determined by one skilled in the art to improve a specific property. For example, up to one part dimer acid of carboxylic acid can be used with two parts of an epoxy-ASA blend of the invention to impart the desired elongation and resistance to aging. The improved epoxy compositions of the invention also may be employed with materials such as silica, clays, powdered glass and the like, to provide binder compositions useful with abrasives, fiber reinforced materials, and the like.

The epoxy compositions of the invention may be used in a variety of applications where resistance to moisture is important. These applications include use as insulating and embedding compounds and the like to improve the moisture resistance of materials and articles of manufacture. Examples of these articles include electrical devices such as armatures of electric motors. In these types of applications, the improved, moisture resistant epoxies of the invention typically are applied to the material or article of manufacture by methods well known in the art. For example, the improved epoxy resins can be applied by processes such as spraying, dipping, pressure impregnation or the like to cover at least a portion of a material or article of manufacture. Epoxy formulations which are liquid at room temperature or at slightly elevated temperatures are preferred for applications such as impregnation or embedding of a material or article of manufacture. High melting point epoxy resin formulations, however, may be preferred for specific applications where high heat distortion is important. Other applications will be apparent when resistance to moisture, toughness, rapid cure times and similar properties provide unique and useful results.

In the following examples, epoxy resins are formulated with ASA's that have varying types of branching in addition to differing numbers of carbons in the alkenyl side chains of the anhydride. The effects of such variations on the properties of the cured products are given below.

FORMULATIONS

Example 1

An epoxy resin (DER 332) available from Dow Chemical Co. is blended with TPSA from Buffalo Color Co. available as product designation (BRL) to provide a control formulation (CTRL). DER 332 has an epoxide equivalent weight of 178 (one epoxide group per 178 g of resin). The epoxy is heated to 50° C. and is blended with the TPSA. The ratio of epoxy resin to TPSA is 1.0:0.88. One part N,N-dimethylbenzylamine per 100 parts of epoxy resin weight is added as a curing agent.

Examples 2-7

Examples 2-7 follow the procedure of Example 1, except that the ASA's given in Table 1, produced by The Humphrey Chemical Co., Inc., are substituted for the TPSA (CTRL).

TABLE 1

| Example | ASA | The Humphrey Chemical Co. Inc. Product Designation |
| --- | --- | --- |
| 2 | TPSA | K-12 |
| 3 | DDSA | J-12 |
| 4 | OSA | J-8 |
| 5 | ESA | F-20 |
| 6 | IOSA | T-18 |
| 7 | TSA | K-9 |

The specific compositions of the epoxy formulations of Examples 1-7 are described in Table 2.

TABLE 2

| ASA-EPOXY FORMULATION | | |
| --- | --- | --- |
| EXAMPLE | BLENDS | PTS/WT |
| 1 | TPSA* | 133 |
|   | DER 332 | 100 |
|   | DMBA | 1 |
| 2 | K-12 | 133 |
|   | DER 332 | 100 |
|   | DMBA | 1 |
| 3 | J-12 | 133 |
|   | DER 332 | 100 |
|   | DMBA | 1 |
| 4 | J-8 | 105 |
|   | DER 332 | 100 |
|   | DMBA | 1 |
| 5 | F-20 | 188 |
|   | DER 332 | 100 |
|   | DMBA | 1 |
| 6 | T-18 | 174 |
|   | DER 332 | 100 |
|   | DMBA | 1 |
| 7 | K-9 | 112 |
|   | DER 332 | 100 |
|   | DMBA | 1 |

*TPSA from Buffalo Color Corp under the production designation BRL. DMBA = N,N-dimethylbenzylamine

WATER RESISTANCE OF CURED ASA/EPOXY BLEND

Examples 1-7 are weighted into tared aluminum dishes and cured for two hours at 95° C. and three hours at 150° C. in a convection oven. The samples then are removed from the weighing dishes and placed into a 95° C. water bath for nine days. The samples are removed, dried and weighed every 24 hours. The change in weight of the samples due to water absorption, expressed as a percent by weight of the original sample (Wo), is shown in Table 3 and plotted in FIG. 1. Table 3 and FIG. 1 show that Example 7 of the invention that employs TSA, i.e., (K-9), gained only about 77.8% of the weight gained by the composition of Example 1 that employs TPSA (CTRL) after the 9 day exposure to the 95° C. water bath.

The water absorption and physical properties of the formulations of Examples 1-7 are compared in Tables 3-6. In each instance, the epoxy formulation of Example 7 that employs TSA provides surprisingly superior properties in addition to reductions in moisture absorption, which makes this material most suitable for wet end electrical applications.

TABLE 3

| CURED ASA/DER 332 BLEND | Wo | 1 DAY % Wt Gain | 2 DAYS % Wt Gain | 3 DAYS % Wt Gain | 4 DAYS % Wt Gain | 5 DAYS % Wt Gain | 6 DAYS % Wt Gain | 7 DAYS % Wt Gain | 8 DAYS % Wt Gain | 9 DAYS % Wt Gain |
| --- | --- | --- | --- | --- | --- | --- | --- | --- | --- | --- |
| Example 1 (CTRL) | 19.4073 | 0.7647 | 0.9228 | 0.9867 | 0.9728 | 1.1470 | 1.0238 | 1.0455 | 1.0676 | 1.0728 |
| Example 2 (K-12) | 19.5329 | 0.6717 | 0.9620 | 0.9476 | 0.9650 | 1.0531 | 1.0096 | 1.0178 | 1.0275 | 1.0306 |
| Example 3 (J-12) | 28.1749 | 0.9636 | 1.0399 | 1.3785 | 1.3863 | 1.4634 | 1.5251 | 1.5304 | 1.5801 | 1.5879 |
| Example 4 (J-8) | 27.8524 | 0.7263 | 0.9224 | 0.9450 | 0.9683 | 0.9418 | 0.9805 | 0.9759 | 0.9820 | 0.9726 |
| Example 5 (F-20) | 27.4295 | 1.4608 | 2.0802 | 2.2224 | 2.2396 | 2.3187 | 2.3438 | 2.3518 | 2.3952 | 2.4218 |
| Example 6 (T-18) | 25.8823 | 0.9443 | 1.2217 | 1.3967 | 1.4299 | 1.4921 | 1.5315 | 1.5130 | 1.5246 | 1.5536 |
| Example 7 (K-9) | 28.1042 | 0.5860 | 0.7163 | 0.8234 | 0.8162 | 0.8056 | 0.8764 | 0.8291 | 0.8404 | 0.8348 |

HARDNESS

The hardness of the ASA/epoxy formulations is measured at 25° C. before and after the 9 day exposure to the 95° C. water bath by the Shore D Hardness test. The results are shown in Table 4.

TABLE 4

| CURED ASA/DER 332 Blend | Shore D Hardness AT 25° C. | | |
| --- | --- | --- | --- |
| | Before Exposure | After Exposure | Percent Change |
| EX 1 - (CTRL) | 85 | 75 | −12% |
| EX 2 - (K-12) | 85 | 75 | −12% |
| EX 3 - (J-12) | 40 | 20 | −50% |
| EX 4 - (J-8) | 80 | 75 | −6% |
| EX 5 - (F-20) | 50 | 10 | −80% |
| EX 6 - (T-18) | 50 | 20 | −60% |
| EX 7 - (K-9) | 85 | 85 | 0.00 |

Unexpectedly, it has been found that the value of the Shore D Hardness of Example 7 that employs TSA (K-9) remained unchanged, confirming total cure. This is an indicator of completeness of reaction and reduced volatiles of resins that employ the ASA's of the present invention.

GLASS TRANSITION TEMPERATURE (TG)

Twenty-four samples of the formulations of each of Examples 1-7 are poured into aluminum weighing dishes and heated in a convection oven at 95° C. for two hours and 150° C. for three hours.

Figure 2:
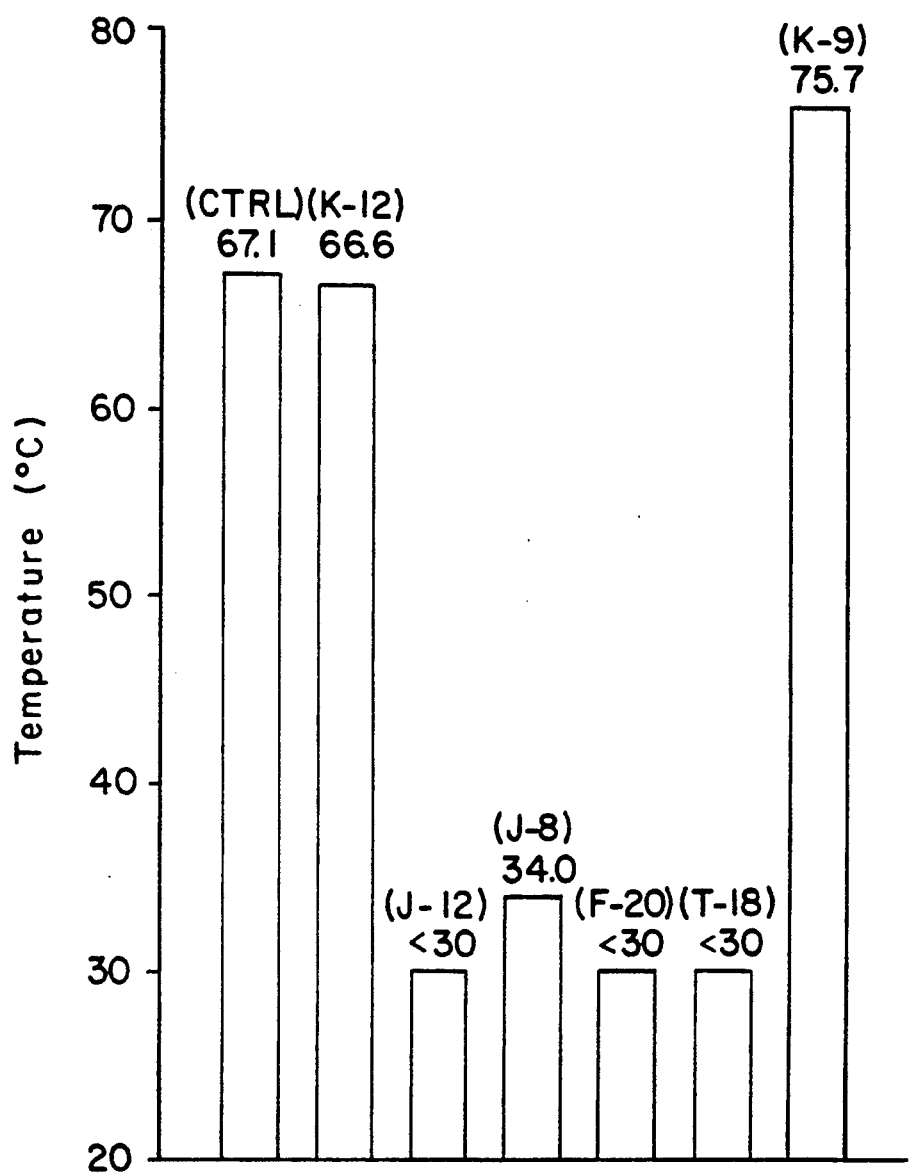
FIG. 2 is a graph showing the glass transition temperatures (Tg) of epoxies cured with various ASA's measured in degrees Celsius.

After cooling, the (Tg) of each blend, measured in degrees Celsius, is evaluated on a Perkin-Elmer Differential Scanning Calorimeter DSC-7 and a Perkin-Elmer Thermal Analysis Data Station. The results are shown in Table 5 and plotted in FIG. 2.

TABLE 5

| Cured ASA/DER 332 Blend | Tg (°C.) |
| --- | --- |
| EX. 1 (CTRL) | 67.12 |
| EX. 2 (K-12) | 66.56 |
| EX. 3 (J-12) | <30.00 |
| EX. 4 (J-8) | 34.00 |
| EX. 5 (F-20) | <30.00 |
| EX. 6 (T-18) | <30.00 |
| EX. 7 (K-9) | 75.70 |

VISCOSITY CHANGES

1. Long-Term Storage

Figure 3:
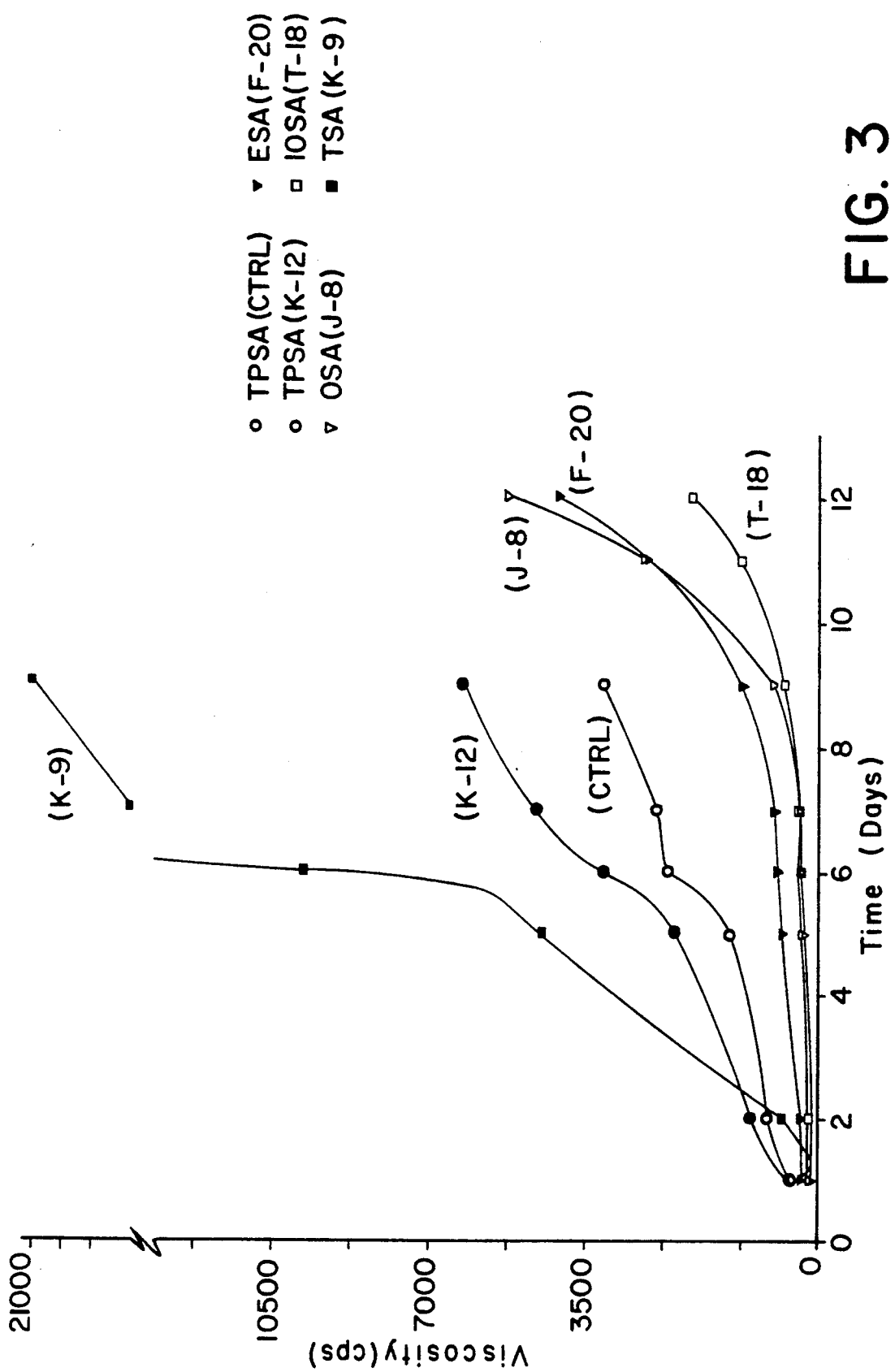
FIG. 3 is a graph showing the results of long term storage testing of ASA/Epoxy resin (DER 332) blends.

Each of the ASA/epoxy blends of Examples 1-7 is thermostated to attain constant temperature. Viscosities are measured by the bubble time method, in which one second of bubble time equals 73 cps. Viscosity changes, measured periodically for a period of up to twelve days at 23.9° C., are plotted in FIG. 3. The epoxy resin blends formed of K-12 and K-9 were found to be the most reactive while the T-18 blend was the slowest to react.

2. Pot Life

Samples of each of the ASA/epoxy resin blends are placed in Gardner tubes. The tubes are heated in a water bath at 70° C., and the viscosities are measured by the same bubble time method as in the long-term storage test every half hour over a period of 5.5 hours. The results of these viscosity measurements are summarized in Table 6.

TABLE 6

| ASA/DER 332 Blend | Viscosity (centipoise) | | | |
| --- | --- | --- | --- | --- |
| | 4.0 Hrs. | 4.5φ Hrs. | 5.0 Hrs. | 5.0φ Hrs. |
| Ex. 1 (CTRL) | 404 | 775 | 1835 | 7694 |
| EX. 2 (K-12) | 279 | 585 | 1133 | 3627 |
| EX. 7 (K-9) | 455 | 1222 | 4845 | 73000 |

As Table 6 illustrates, the (K-9) composition of Example 7 attains an exceedingly high viscosity after only 4 to 5 hours. This indicates that the composition of Example 7 is highly reactive and may be cured at lower temperatures or in shorter time periods.

Although the present invention has been described in detail, it is clearly understood that the same is by way of example only and is not to be taken by way of limitation, the scope of the present invention being limited only by the terms of the appended claims.

What is claimed is:

1. A method of improving moisture resistance of an electrical component, said method comprising:
   providing an epoxy composition comprising a mixture of epoxy resin and alkenylsuccinic anhydride having three carbon branched alkenyl side chains in which at least 90% have a total of 9 carbons, and
   applying a coating of said epoxy composition to at least a portion of said electrical component to thereby improve the moisture resistance of said electrical component.

2. The method of claim 1 wherein said alkenylsuccinic anhydride is tripropenylsuccinic anhydride.

3. The method of claim 1 wherein said epoxy composition is selected from the group of bisphenol type A epoxies and derivatives of bisphenol type A epoxies.

4. The method of claim 3 wherein said epoxy and said alkenylsuccinic anhydride are present in a ratio of about 1 part epoxy to about 0.88 part of said alkenylsuccinic anhydride.

5. The method of claim 4 wherein said composition further comprises a curing agent selected from the group consisting of alkanolamines, secondary amines, tertiary amines, quartenary ammonium salts, alkylamino phenols and metal carboxylates.

6. The method of claim 2 wherein said tripropenylsuccinic anhydride is employed in combination with at least one other alkenylsuccinic anhydride.

7. The method of claim 6 wherein said tripropenylsuccinic anhydride is at least ten percent by weight of said epoxy composition.

8. A method of imparting improved moisture resistance to epoxy resins comprising,
adding an alkenylsuccinic anhydride having three carbon branched alkenyl side chains in which at least 90 percent have a total of 9 carbons to an epoxy resin to form a mixture of said alkenylsuccinic anhydride and said epoxy, and
curing said mixture.

9. The method of claim 1 wherein said alkenylsuccinic anhydride is tripropenylsuccinic anhydride.

10. The method of claim 8 wherein said epoxy is selected from the group of bisphenol type A epoxies and derivatives thereof.

11. The method of claim 10 wherein said epoxy and said alkenylsuccinic anhydride are present in a ratio of about 1 part epoxy to about 0.88 part of said alkenylsuccinic anhydride.

12. The method of claim 11 wherein said curing is performed by addition of a curing agent to said mixture.

13. The method of claim 12 wherein said curing agent is selected from the group consisting of alkanolamines, secondary amines, tertiary amines, quartenary ammonium salts, alkylamino phenols and metal carboxylates.

14. The method of claim 13 wherein said curing agent is N,N-dimethylbenzylamine.

15. The method of claim 9 wherein said tripropenylsuccinic anhydride is employed in combination with at least one other alkenylsuccinic anhydride.

16. The method of claim 15 wherein said tripropenylsuccinic anhydride is at least ten percent by weight of said epoxy composition.

17. An article comprising an electrical component or device insulated with a moisture resistant composition comprising a mixture of epoxy resin and an alkenylsuccinic anhydride having three carbon branched alkenyl side chain in which at least 90% have a total of 9 carbons.

18. The article of claim 17 wherein said alkenylsuccinic anhydride is tripropenylsuccinic anhydride.

19. The article of claim 18 wherein said tripropenylsuccinic anhydride is employed in combination with at least one other alkenylsuccinic anhydride.

20. The article of claim 19 wherein said tripropenylsuccinic anhydride is present in an amount at least ten percent by weight of said epoxy composition.

21. An electrical component produced by the method of claim 1.

* * * * *